UNITED STATES PATENT OFFICE.

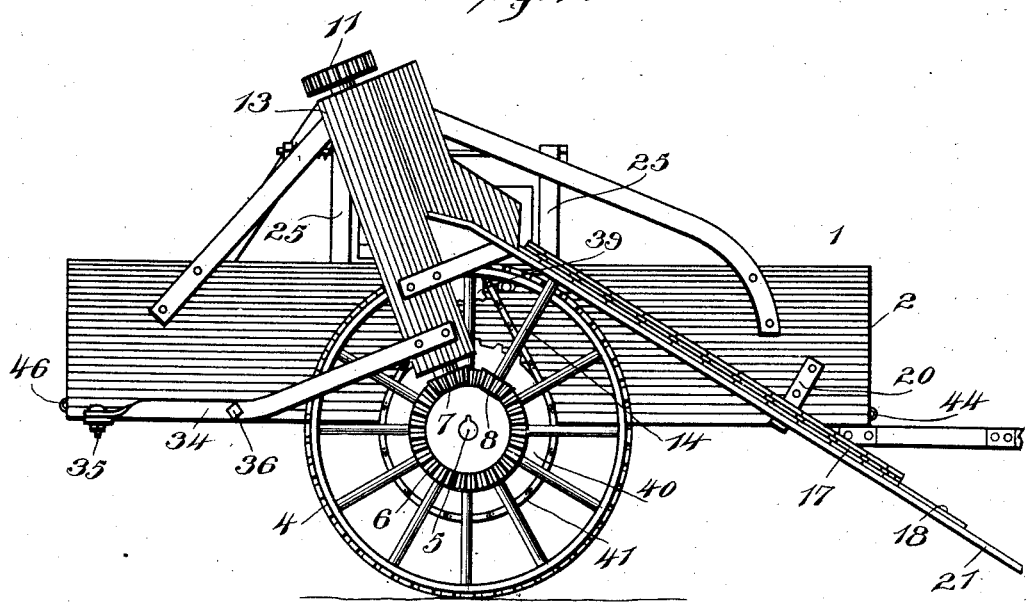
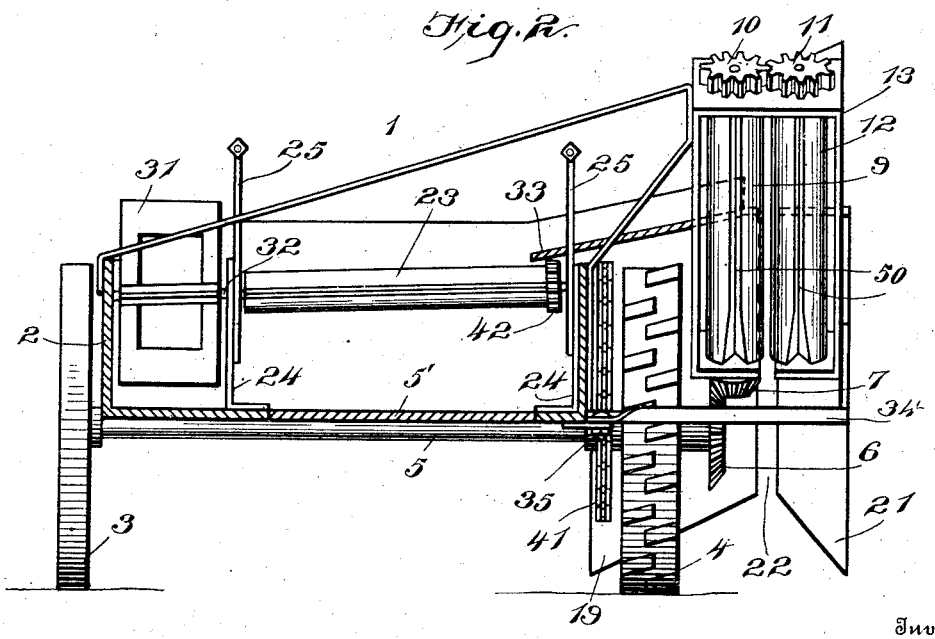

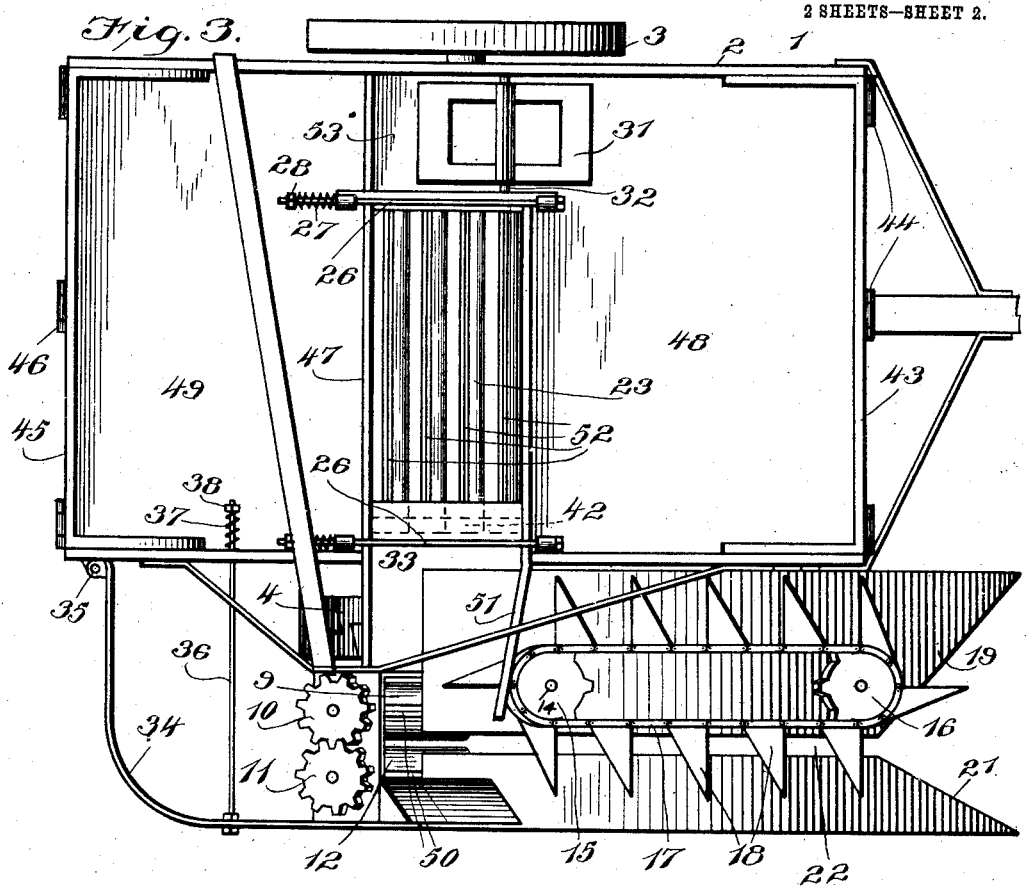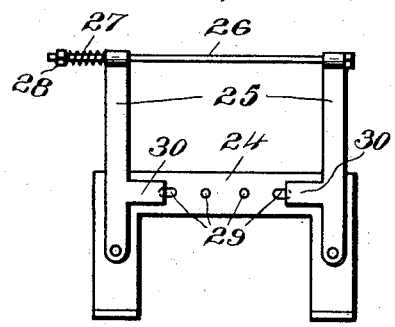

JOSEPH ROSS, OF VINCENNES, INDIANA.

CORN HARVESTING AND HUSKING MACHINE.

No. 874,247.      Specification of Letters Patent.      Patented Dec. 17, 1907.

Application filed July 25, 1906. Serial No. 327,681.

*To all whom it may concern:*

Be it known that I, JOSEPH ROSS, a citizen of the United States, residing at Vincennes, in the county of Knox and State of Indiana, have invented certain new and useful Improvements in Corn Harvesting and Husking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to corn harvesting and husking machines, and has for its object to provide a machine whereby the ears of corn are snapped from the stalks and the ears husked and the corn separated from the husks.

A further object of my invention is to provide a machine of the character described which will remove the ears of corn from their stalks while the machine is in motion, and which will husk the ears and separate the corn from the husks.

With these objects in view my invention consists in the novel construction of the snapping rolls, and means for feeding the stalks into the rolls.

My invention also consists in a novel arrangement of the husking rolls and in the construction which provides for separating the corn from the husks.

My invention also consists in the novel construction and arrangement in a corn harvesting and husking machine which embodies mechanism for leading the stalks in the snapping rolls, for removing the ears of corn from their stalks, for husking the corn and for separating the corn from the husks.

My invention also consists in certain details of construction and in certain combinations of parts which will be first fully described and afterwards specifically pointed out in the appended claims.

Referring to the accompanying drawings: Figure 1 is a side elevation of the machine. Fig. 2 is a rear elevation, the body of the machine being shown in section. Fig. 3 is a top plan view. Fig. 4 is an end view of one of the snapping rolls, and Fig. 5 is a detail view of the supporting and adjusting bracket for the husking rolls.

Like numerals of reference indicate the same parts throughout the several figures in which:—

1 indicates the machine which comprises the body 2 and wheels 3 and 4, said wheel 4 being as shown in Fig. 2 the driving wheel and having its tread roughened or serrated in order to more positively engage the earth or soil as is common in agricultural machines.

Secured to the shaft 5 of the wheel 4 or otherwise connected to said wheel is a large bevel gear 6, and meshing with said bevel gear 6, as shown in Fig. 1, are two similar beveled pinions 7 and 8. Carried on the shaft of the beveled pinion 7 is one of the snapping rolls 9, and carried on the opposite end of the shaft of the snapping roll 9 is a pinion wheel 10. In mesh with said pinion wheel 10 is a similar wheel 11 carrying on its shaft a snapping roll 12. A suitable casing 13 is provided for said snapping rolls, the shaft of said rolls being suitably journaled therein as shown in Fig. 2.

Carried on the shaft 14 of the beveled pinion 8 (Fig. 1) is a sprocket wheel 15 as shown in Fig. 3, and associated with said sprocket wheel 15 is a similar wheel 16, an endless chain 17 being carried by said sprocket wheels 15 and 16. Secured to said chain 17 at intervals is a series of outwardly extending arms or fingers 18 as shown in Fig. 3. The shaft 14 carries the sprocket wheel 15 while the sprocket wheel 16 is journaled in a forwardly and downwardly extending plate or guide 19 (Fig. 3), said plate or guide 19 being connected to the body 2 of the machine by means of a brace 20 or other suitable means. Associated with said plate or guide 19 is a similar plate or guide 21 (Fig. 3), the forward edges of said plates or guides 19 and 21 being beveled as shown in Fig. 3, while a space 22 is left between the inner edges of said guides or plates 19 and 21 as shown in Fig. 3, and it will be seen that the arms or fingers 18 on the chain 17 extend across said opening 22. As shown, the opening 22 extends from the beveled ends of the plates or guides 19 and 21 to the snapping rolls 9 and 12, the purpose of which will be hereinafter fully described.

23 indicates the husking rolls, which as shown in Figs. 2 and 3, are located within the body of the machine, and which as shown in Fig. 2 are preferably inclined downwardly from the snapping rolls 9 and 12. The said husking rolls 23 are journaled in brackets 24 (Fig. 5) to which brackets are pivoted levers 25. A bolt or pin 26 passing through the upper ends of said levers 25 and carrying a coil spring 27 thereon, tension is applied to said levers 25 to draw said levers together by means of a nut 28 on the end of said rod or pin 26. The shafts of the husking rolls 23 are journaled in the openings 29 in the supporting bracket 24, the end openings 29 being formed like a slot so that the horizontal extensions 30 on the levers 25 engage the shafts of the husking rolls applying a tension thereto in order to adjust the said husking rolls. Associated with said husking rolls at the lower ends thereof is a fan 31 which is carried on the shaft 32 of one of said husking rolls.

Leading from the plate or guide 19 (Figs. 2 and 3) over the side of the body 2 of the machine and extending a short distance over the top of the husking rolls 23 is a chute 33 for conveying the ears from the snapping rolls 9 and 12 to the husking rolls 23.

34 indicates a brace (Fig. 3) which is pivoted or hinged at 35 and is connected to the casing 13 of the snapping rolls 9 and 12, said brace being connected to the body of the machine by means of a rod 36 carrying a coil spring 37 and a nut 38, by means of which construction tension can be applied to said rod in order to draw the lower end of the casing 13 and outer snapping roll 12 towards the inner snapping roll 9, the tension of said snapping rolls 9 and 12 being regulated by means of the rod 36 and spring 37 and nut 38.

Carried on the shaft of one of the husking rolls 23 is a sprocket 39 (Fig. 1) and carried on the shaft 5 of the drive wheel 4 is a sprocket 40 and chain 41 which communicate the motion of the sprocket 40 to the said sprocket 39 and rotating one of the husking rolls 23. Each of the husking rolls 23 is provided with a gear wheel 42 by means of which each of the husking rolls 23 is rotated.

Located on the forward portion of the body of the machine is a gate 43 which may be swung down on its hinges 44 in order to remove the corn from the machine, and located on the rear of the body of the machine is a similar gate 45 which may be swung down on its hinges 46 in order to remove the corn husks from the machine. Walls 47 extend along both sides of the husking rolls 23 in order to prevent the corn from passing over the sides of the rolls while being husked. By means of the location of the husking rolls the body of the machine is divided into a forward compartment 48 for the corn and an after compartment 49 for the husks. Suitable braces, as shown, are provided for securely bracing the mechanism, the bracing, however, being an immaterial feature, and can be arranged in any desired manner.

Having thus described the several parts of my invention its operation is as follows: In order to snap the ears of corn from their stalks the machine is started at one end of the row of corn and is drawn along the stalks of the corn being guided between the plates or guides 19 and 21 by reason of the beveled construction of the forward ends of said plates or guides; the chain 17 carrying the fingers or arms 18 is so geared by means of the beveled pinion 8 on the bevel gear 6 that the fingers or arms 18 on the chain 17 pass over the plates or guides 19 and 21 at the same speed that the machine is passing over the ground. Consequently while the machine is moving forward the fingers or arms 18 passing rearwardly do not move relatively to the ground. A stalk which is guided into an opening 22 between the plates or guides 19 and 21 is caught between two of the arms or fingers 18, and as the machine continues to move forward the said two arms or fingers 18 move rearwardly and carry the said stalk between the snapping rolls 9 and 12, said snapping rolls being rotated by means of the beveled pinion 7 on the bevel gear 6 engage the said stalk; and by reason of the grooves 50 in said snapping rolls the stalk is carried through and out of the rolls, the ears of corn on the stalk being snapped from the stalk and dropped upon the upper end of the plate or guide 19 where the arms or fingers 18 start on their forward run, and engage the said ears of corn and force them down the chute 33 on to the husking rolls 23. A wall 51 arranged across the guide or plate 19 prevents the corn which has been snapped from the stalks from passing down the said plate or guide and acts as a guide for the corn down the chute 33. The corn passes on to the husking rolls 23, said rolls revolving and being provided with a series of longitudinal grooves 52. The husks of the corn are engaged by the said rolls and carried through the same, the ears of corn being gradually worked down the husking rolls on account of the incline thereof where they empty in the fan compartment 53, the said fan being rotated engages the ears of corn and forces them into the forward portion 48 of the body of the machine. The husks passing between the husking rolls drop to the bottom of the body, the said husking rolls being tensioned or adjusted by means of the rods 26 and springs 27 as before described, while a door or removable section 5' is located directly under the husking rolls, by means of which door or section the husks can be dropped from the machine without being taken from the rear of the machine as before described.

Referring to Fig. 4 and in this connection also to Fig. 2 it will be seen that the grooves 50 in the snapping rolls 9 and 12 flare outwardly so that said grooves are wider and deeper at the forward ends of the rolls than at the after ends. By means of this construction the snapping rolls engage the stalks more readily and choking of the rolls is obviated.

Having thus described my invention what I claim as new and desire to secure by Letters Patent of the United States is:

1. In a corn harvesting and husking machine, the combination of snapping rolls, a casing therefor, said snapping rolls being journaled in said casing, guide plates associated with said rolls and spaced apart from each other, means for leading the corn stalks between said guide plates, a brace 34 connected to the said casing, a rod 36 connected to said brace for applying tension to said snapping rolls to resiliently hold the same together, and a series of husking rolls associated with said snapping rolls, substantially as described.

2. In a corn harvesting and husking machine, the combination of snapping rolls, a casing therefor, one end of said snapping rolls being free to approach the other, means for applying tension to said rolls to resiliently hold the same together, said rolls being provided with a series of longitudinal grooves which grooves flare outwardly near the forward ends of said rolls, substantially as described.

In testimony whereof, I affix my signature, in presence of two witnesses.

JOSEPH ROSS.

Witnesses:
JOSEPH S. KITCHELL,
JOSEPH ROSEMAN.